(12) United States Patent
Rhyu et al.

(10) Patent No.: US 10,075,774 B2
(45) Date of Patent: *Sep. 11, 2018

(54) APPARATUS AND METHOD FOR DELIVERING AND RECEIVING MULTIMEDIA DATA IN HYBRID NETWORK

(71) Applicant: Samsung Electronics Co., Ltd., Suwon-si, Gyeonggi-do (KR)

(72) Inventors: Sung-Ryeul Rhyu, Yongin-si (KR); Kyung-Mo Park, Seoul (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,927

(22) Filed: Dec. 21, 2017

(65) Prior Publication Data

US 2018/0139510 A1  May 17, 2018

Related U.S. Application Data

(63) Continuation of application No. 14/051,707, filed on Oct. 11, 2013, now Pat. No. 9,888,293.

(30) Foreign Application Priority Data

Oct. 11, 2012 (KR) .................. 10-2012-0113052

(51) Int. Cl.
*H04N 21/61* (2011.01)
*H04N 21/2381* (2011.01)
(Continued)

(52) U.S. Cl.
CPC ..... *H04N 21/6156* (2013.01); *H04L 65/4076* (2013.01); *H04L 65/607* (2013.01);
(Continued)

(58) Field of Classification Search
CPC .......... H04N 21/2381; H04N 21/2665; H04N 21/6175; H04L 65/4076; H04L 65/607
(Continued)

(56) References Cited

U.S. PATENT DOCUMENTS 7,929,560 B2    4/2011  Morioka
2004/0267953 A1  12/2004  Dunbar et al.
(Continued)

FOREIGN PATENT DOCUMENTS

CN    101606354 A    12/2009
EP    2 830 318 A1    1/2015
(Continued)

OTHER PUBLICATIONS

Kyungmo Park, Proposal text for MMT Payload Format, Motion Picture Expert Group or ISO/IEC JTC1/SC29/WG11/m25137, Jul. 14, 2012, Stockholm, Sweden.
(Continued)

*Primary Examiner* — Nnenna N Ekpo
(74) *Attorney, Agent, or Firm* — Jefferson IP Law, LLP

(57) ABSTRACT

A method of delivering media data in a hybrid network capable of providing broadcasting and internet communication together is provided. The method includes generating a Media Processing Unit (MPU) to process media data, and delivering the generated MPU, wherein the MPU includes an MPEG Media Transport (MMT) Processing Unit (MMPU) box including information on the MPU, a Media Data box (MDAT) including one or more media data fragments which are generated from the media data, and an MMFU box including information on each media data fragment.

5 Claims, 6 Drawing Sheets

(51) Int. Cl.
*H04N 21/2665* (2011.01)
*H04L 29/06* (2006.01)

(52) U.S. Cl.
CPC ..... *H04N 21/2381* (2013.01); *H04N 21/2665* (2013.01); *H04N 21/6175* (2013.01)

(58) Field of Classification Search
USPC .................................. 725/109, 114, 116, 118
See application file for complete search history.

(56) References Cited

U.S. PATENT DOCUMENTS

| | | | |
|---|---|---|---|
| 2008/0117926 | A1 | 5/2008 | Bassali et al. |
| 2008/0175148 | A1 | 7/2008 | Todd et al. |
| 2009/0037432 | A1* | 2/2009 | Kamura ............ G06F 17/30194 |
| 2011/0255558 | A1 | 10/2011 | Hwang et al. |
| 2011/0299586 | A1 | 12/2011 | Odlund et al. |
| 2012/0250682 | A1* | 10/2012 | Vincent ............... H04L 12/4633 370/390 |
| 2013/0298177 | A1 | 11/2013 | Rhyu et al. |
| 2014/0064280 | A1* | 3/2014 | Qin .................... H04B 7/18582 370/392 |

FOREIGN PATENT DOCUMENTS

| | | |
|---|---|---|
| EP | 2 849 440 A1 | 3/2015 |
| RU | 2366098 C2 | 8/2009 |
| WO | 2009-109232 A1 | 9/2009 |
| WO | 2012-099403 A2 | 7/2012 |

OTHER PUBLICATIONS

Fernando et al, Technologies under Consideration (TuC) for MMT, Motion Picture Expert Group or SO/IEC JTC1/SC29/WG11 N12170, Aug. 24, 2011, Torino, Italy.

Park et al., Proposed text for Working Draft of MPEG Media Transport, Motion Picture Expert Group or SO/IEC JTC1/SC29/WG11/m26237, Jul. 14, 2012, Stockholm, Sweden.

Kyung-Mo Park. Youngkwon Lim (Samsung Electronics Co., Lid), Shuichi Aoki (NHK), Gerard Fernando (ZTE), Jin Young Lee (ETRI), International Organization for Standardization Organisation Internationale De Normalisation ISO/IEC JTC1/SC29/WG11 Coding of Moving Pictures and Audio, MPEG/N12894, D Jul. 2012, Stockholm, Sweden.

AHG on MMT; Review of w11792; International Organisation for Standardisation Organisation Internationale De Normalisation ISO/IEC JTC1/SC29/WG11 Coding of Moving Pictures and Audio; ISO/IEC JTC1/SC29/WG11; Mar. 2011; Geneva, Switzerland.

ISO/IEC; Information technology—High efficiency coding and media delivery in heterogeneous environments—Part 1: MPEG media transport (MMT); ISO/IEC JTC 1/SC 29 N; ISO/IEC CD 23008-1; STD Version 21c2; Jul. 2012.

\* cited by examiner

APPARATUS AND METHOD FOR DELIVERING AND RECEIVING MULTIMEDIA DATA IN HYBRID NETWORK

CROSS-REFERENCE TO RELATED APPLICATION(S)

This application is a continuation application of prior application Ser. No. 14/051,707, filed on Oct. 11, 2013, which claimed the benefit under 35 U.S.C. § 119(a) of a Korean patent application filed on Oct. 11, 2012 in the Korean Intellectual Property Office and assigned Ser. No. 10-2012-0113052, the entire disclosure of each of which is hereby incorporated by reference.

TECHNICAL FIELD

The present disclosure relates to an apparatus and method for delivering and receiving multimedia data in a hybrid network. More particularly, the present disclosure relates to an apparatus and method for reproducing MPEG Media Transport (MMT) data when the MMT is not a supported data type.

BACKGROUND

Recently, in a multimedia service, a hybrid network in which a broadcasting network and a communication network are simultaneously connected, and an MPEG Media Transport (MMT) technology which provides hybrid content including multimedia data, application and files have been developed.

An MMT stream is divided and transmitted by a unit of Media Processing Units (MPU), and a media reproduction device also receives and reproduces the MMT stream by the unit of MPUs. The MMT stream is not divided unconditionally by a predetermined time or a predetermined size when the MMT is divided by the MPU, but is divided by the unit enough that a structure of media included in a corresponding MPU is described and an operation which a corresponding MMT stream requires is performed.

In contrast, in the MPU configuration according to the related art, a reproduction apparatus which does not support the MMT cannot receive media data included in the MPU. Further, the MPU configuration according to the related art is effective for delivery of timed media data which is reproduced at a predetermined time, but is inefficient for delivery of non-timed media data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a Media Processing Units (MPU) structure in which a media reproducing apparatus which does not support an MPEG Media Transport (MMT) can receive and reproduce MMT media data.

Another aspect of the present disclosure is to provide an apparatus and method for delivering multimedia data, which can deliver non-timed media data.

Still another aspect of the present disclosure is to provide an apparatus and method for delivering multimedia data, in which a reception side need not receive an update for an MPU again even though a network node deletes or modifies a Media Fragment Unit (MFU), and which can delete the MPU by a unit of an MFU in consideration of a relationship of the MFU covering different Access Units (AUs).

In accordance with an aspect of the present disclosure, a method of delivering media data in a hybrid network capable of providing broadcasting and internet communication together is provided. The method includes generating a MPU to process media data, and delivering the generated MPU, wherein the MPU includes an MPEG Media Transport (MMT) Processing Unit (MMPU) box including information on the MPU, a Media Data box (MDAT) including one or more media data fragments which are generated from the media data, and an MMFU box including information on each media data fragment.

In accordance with an aspect of the present disclosure, the MMPU box includes at least one of a first flag which indicates whether the media data corresponds to timed data or to non-timed data, a second flag which indicates whether the MPU includes an MFU, and a third flag which indicates whether the MPU corresponds to an original MPU or to a modified MPU.

In accordance with an aspect of the present disclosure, the MMPU box includes an AU structure box having information on the AU, and the MPU includes one or more AUs having plural media data fragments.

In accordance with an aspect of the present disclosure, the MMPU box includes an MFU structure box which includes the at least one media data fragment and information on the MMFU box corresponding to the media data fragment.

In accordance with an aspect of the present disclosure, the MFU structure box includes information on a relationship between the media data fragment and the AU, and the MPU includes one or more AUs having plural media data fragments.

In accordance with an aspect of the present disclosure, the MFU structure box includes at least one of reference information among the media data fragments, priority information, and temporal and spatial hybrid layer information, and the pieces of information are determined in consideration of the media data fragments which belong to different AUs.

In accordance with an aspect of the present disclosure, the information on the media data fragments includes at least one of a sequence number, a size, and an offset of each media data fragment.

In accordance with an aspect of the present disclosure, the third flag is modified enough to indicate that the media data fragment is an MPU modified by a deleted entity, and at least one of the media data fragments included in the MPU is deleted.

In accordance with another aspect of the present disclosure, an apparatus for delivering media data in a hybrid network capable of providing broadcasting and internet communication together is provided. The apparatus includes a generating unit which generates an MPU to process media data, and a delivering unit which delivers the generated MPU, wherein the MPU includes an MMPU box which includes information on the MPU, an MDAT which includes one or more media data fragments generated from the media data, and an MMFU box which includes information on each media data fragment.

In accordance with another aspect of the present disclosure, method of receiving media data in a hybrid network capable of providing broadcasting and internet communication together is provided. The method includes receiving an MPU to process media data, and restoring the media data by using the generated MPU, wherein the MPU includes an MMPU box which includes information on the MPU, an MDAT which includes one or more media data fragments generated from the media data, and an MMFU box which includes information on each media data fragment.

In accordance with another aspect of the present disclosure, an apparatus for receiving media data in a hybrid network capable of providing broadcasting and internet communication together is provided. The apparatus includes a receiving unit which receives an MPU to process media data, and a restoring unit which restores the media data by using the generated MPU, wherein the MPU includes an MMPU box which includes information on the MPU, an MDAT which includes one or more media data fragments generated from the media data, and an MMFU box which includes information on each media data fragment.

In accordance with another aspect of the present disclosure, the apparatus for delivering multimedia data can deliver data of conventional media formats by using the MPU is provided. The apparatus includes a non-timed media data with the MPU structure which is compatible with a conventional reproduction apparatus. Further, although the MFU is deleted, the updating of the MPU need not be performed. Also, the MPU can be deleted by a unit of the MFU considering a relationship of the MFU covering the different AUs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiment of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the description of various embodiments of the present disclosure will be described based on the MPEG Media Transport (MMT) standard.

A Media Fragment Unit (MFU) is a general container which is independent of a specific media codec and which includes an encoded media data which a media decoder is capable of independently consuming. The MFU is equal to or smaller than an Access Unit (AU) and includes information which can be utilized by delivery layers.

The AU is the smallest data entity to which timing information can be attributed. With respect to coded media data having no designated timing information for decoding and presentation associated with the decoding, an AU is not defined.

A Media Processing Unit (MPU) is a generic container which is independent of any specific media codec and contains one or more AUs and additional delivery and consumption related to information. For non-timed data, an MPU includes a portion of data without AU boundaries. The MPU is a coded media data unit which can be completely and independently processed. In this context, processing means encapsulation into a MMT package or a packet for delivery.

The non-timed data is a data element which is consumed at a non-specific time. The non-timed data may have an available timing range in which data is executed.

Timed data is defined as a data element which is associated with a specific time for decoding and presentation.

Hereinafter, the various embodiments of the present disclosure will be described in detail.

Figure 1:
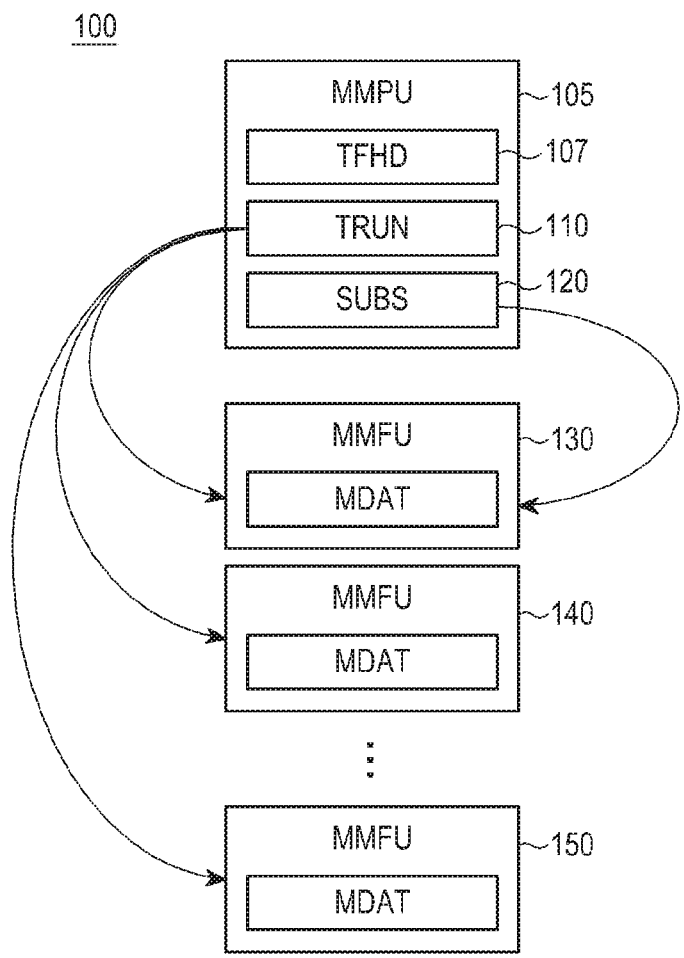
FIG. 1 is a block diagram illustrating a Media Processing Units (MPU) structure according to the related art.

FIG. 1 is a block diagram illustrating a MPU structure according to the related art.

Referring to FIG. 1, an MPU 100 includes an MMT Processing Unit (MMPU) 105 and one or more MFUs 130, 140 and 150. The MMPU includes information on a MPU structure, and also includes boxes such as a Track Fragment Header (TFHD) 107, Track Fragment Run (TRUN) 110 and Sub-Sample information (SUBS) 120 shown in FIG. 1. The description of details of the corresponding boxes will be omitted. The respective MFUs 130, 140 and 150 each include an MMFU and Media Data Box (MDAT). Each MMFU includes information on a structure of the corresponding MFU, and the MDAT includes actual media data. In contrast, media data included in the MFUs are timed media data in the description. In the case of non-timed media data, because division and delivery of the non-timed media data is unnecessary, the non-timed media data is delivered in the MPU but is not divided and delivered in the form of the MFU.

Further, although not shown in the drawings, an AU may include a plurality of MFUs. For example, if five MFUs are present in the MPU, a first two MFUs among the five MFUs are included in a first AU one, and three residual MFUs may be included in a second AU. In this case, the MMPU includes an AU structure having information on the AU structure. Particularly, the AU structure is included in a box of TRUN 110 in the MMPU.

Table 1 indicates the structure of the AU for the timed media data of FIG. 1.

TABLE 1

```
aligned(8) class TrackRunBox extend Full Box('trun', version, tf_flags)
{unsigned int(32) sample_count;
{unsigned int(32) sample_duration;
if (version == 0) {unsigned int(32) sample_composition_time_offset;}
else {signed int(32) sample_composition_time_offset;}
unsigned int(32) decoding_order;
//flag=0x1000
unsigned int(32) subsample_start_id;       //flag=0x2000
unsigned int(32) subsample_end_id;         //flag=0x2000
unsigned int(8) rap_flage;                 //flag=0x4000}
[sample_count] }
```

The information on the AU as indicated in Table 1 is included in the TRUN box 110. The TRUN box 110 includes a basic length and the number of a corresponding timed media data sample, lengths of samples when the respective samples have a different length, a reproduction time and a decoding order of the samples, a determination of whether the corresponding sample is a Random Access Point (RAP), and information on a start and termination number of a corresponding MFU.

In the case of the non-timed data, however, because the MPU 100 may not include an MFU, the MPU may be required to include information on a start index and a termination index of the MFU. For example, in the case in which the MFU includes the non-timed media data, the MPU 100 is not required to have the AU structure and the temporal information. Therefore, unnecessary information becomes an overhead. According to various embodiments of the present disclosure, the AU is not required to include the AU structure and the temporal information, however, the MFU may be required to include such information. According to various embodiments of the present disclosure, an indication as to whether the MPU includes the MFU should be provided.

In contrast, timed media data according to the related art which do not support an MMT format cannot be encapsulated by an MFU of the MMT format. Accordingly, in the case in which the MPU 100 includes the conventional media data, the MPU is not required to include information on the MFU. Further, because the media reproduction apparatus according to the related art does not support the MMT format so as not to recognize a box in the MPU which is provided by the MMT, from received media data, the media reproduction apparatus according to the related skips an MMPU box or an MMFU box. Accordingly, the media reproduction apparatus according to the related is unable to access any box. As a result, the media reproduction apparatus according to the related art does not recognize the media data included in the MMFU. Accordingly, the MPU structure according to the related art is not compatible with the media reproduction apparatus according to the related art which does not support the MMT.

According to various embodiments of the present disclosure, an MPU structure is provided such that the MPU structure is made to be compatible with a media reproduction apparatus which does not support the MMT. According to various embodiments of the present disclosure, the MMFU includes a sequence number of an MFU, and size information and an offset of the media data.

As described above, on the other hand, the MMT timed media data is delivered and received by a unit of an MFU. Although some MFUs may be lost during delivery of plural MFUs, a certain network node may not deliver the MFUs in consideration of a channel condition. For example, in the case in which the channel condition has been suddenly deteriorated, if a rate of a data transmission is intended to be lowered by half, the half of the entire MFUs to be transmitted are not delivered. In this case, a reception side receives information on the whole MPUs again when any one MFU is lost. For example, the whole media data can be restored by updating the MPU in which loss of the MFU is reflected or indicated. According to various embodiment of the present disclosure, when some MFUs are lost, the MPU structure allows for the whole media data to be restored although the whole MPUs are not received again. To do this, according to various embodiments of the present disclosure, a corresponding MPU is enabled to include information indicating whether an original MPU has a modified portion, so that the reception side can recognize which portion is modified or deleted through the corresponding information.

The structure of the MPU according to various embodiments of the present disclosure will be described in more detail.

According to various embodiments of the present disclosure, the MMPU includes at least one of a "flag" field, a "media information table" field, a "AU structure" field, and a "MPU structure" field.

First, the "flag" field will be described. According to various embodiments of the present disclosure, the "flag" field includes three flags. "Flag 1" indicates whether data included in the corresponding MPU is timed data or non-timed data. "Flag 2" indicates whether the corresponding MPU includes an MFU. "Flag 3" indicates whether the corresponding MPU is an original MPU or a modified MPU.

The flag 1 will be described in detail. If the flag 1 is "1 (true)", then flag 1 indicates that the MPU 100 has the timed media data. If the flag 1 is "0 (false), then flag 1 indicates that the MPU 100 has the non-timed media data. Various embodiments of the present disclosure are not limited thereto. For example, the inverse thereof is possible. Further, if the flag 1 is "1 (true)", then flag 1 indicates that temporal information on the timed media data is provided. If the flag 1 is "0 (false)", then flag 1 indicates that the temporal information is not provided. The temporal information on the timed media data means a time that the timed media data is reproduced.

"Flag 2" will be described in detail. If the flag 2 is "1 (true)", then flag 2 indicates that the MPU has media data encapsulated with an MFU. If the flag 2 is "0 (false)", then flag 2 indicates that the MPU has media data which is not encapsulated with an MFU. Various embodiments of the present disclosure are not limited thereto. For example, the inverse thereof is possible. For reference, the media data having a media format which is not encapsulated with the MFU may be media data expressed by, for example, MPEG-Transport Stream (TS) or ISOFF. In addition, if the flag 2 is "true", then flag 2 indicates that information on the MFU structure is provided. If the flag 2 is "false", then flag 2 indicates that information on the MFU structure is not provided. The above-mentioned flag 2 indicates whether the MPU includes the media data encapsulated with the MFU.

In other words, the flag 2 indicates whether the MPU includes the media data which supports the MMT.

"Flag 3" will be described in detail later.

Hereinafter, the MFU structure will be described.

It is assumed that the MFU structure is independently present regardless of the absence or the presence of the AU. In the case in which the AU is present and includes the MFU, the MFU structure includes information on a relationship between the AU and the MFU. In contrast, in the case in which the AU is not present and does not include the MFU, the MFU structure does not include information on a relationship between the AU and the MFU. The phrase "information on the relationship between the AU and the MFU" refers to information on the number of the MFUs which belong to each AU. Accordingly, using mapping information to map an AU table with an MFU table is possible.

Further, in the case in which the MFU includes timed media data, because the MFU includes a type of "timed media data", indicating the type of the media data included in the MFU as a predetermined basic value is possible and describing the type of the media included in the MFU is possible. Therefore, the media type can be selected from the media types set in a media information table. In contrast, in the case in which the MFU includes the non-timed media data, one MFU may have media types which are different from one another. Therefore, indicating which media type of media information table is mapped with each MFU is possible.

Further, the MFU structure provides information on an association relationship among various MFUs in the MPU. The MFU included in the conventional MPU structure shown in FIG. 1 has a "dependency_counter" field showing a frequency that different MFUs refers to one another, a "priority" field showing the priority among the MFUs, and a "multilayer information" field showing information on spatial and temporal hybrid layers. A reference range of the information is limited to different MFUs belonging to one AU. For example, assuming that an AU 1 includes an MFU 1, an MFU 2 and an MFU 3, and an AU 2 includes an MFU 3 and an MFU 4, in the MFU according to the related art, each of "dependency_counter", "priority" and "multilayer information" shows only a reference relationship among the MFU 1, the MFU 2 and the MFU 3 which belong to the AU 1. Similarly, each of "dependency_counter", "priority" and "multilayer information" shows only a reference relationship between the MFU 3 and the MFU 4 which belong to the AU 2. However, a reference relationship among the MFUs which belong to the AU 1 and the AU 2 which are different from each other may be present. According to the related art, because the information in relation to the MFUs included in an AU is limited to the MFUs included in the same AU, if a reference relationship among MFUs belonging to different AUs exists, then a network node may not be able to effectively delete or modify the MFU when the information is shown in consideration of only the relationship among the MFUs which are included in an AU.

According to various embodiments of the present disclosure, "dependency_counter", "priority" and "multilayer information" are shown in consideration of the relationship among the MFUs which are present in different AUs. In result, the network node has a channel condition in confused state. An efficiency of removal of an MFU may increase when a certain MFU is intended to be removed. The removal of the MFU will be described with reference to FIGS. 2A and 2B.

Figure 2A:
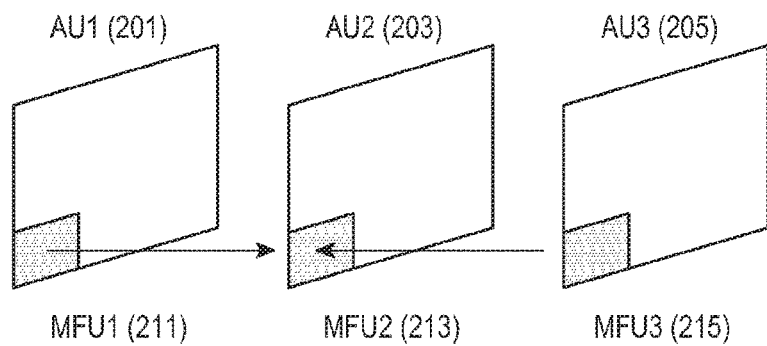
FIGS. 2A and 2B are views illustrating a process of removing a Media Fragment Unit (MFU) in a network node according to an embodiment of the present disclosure.
Figure 2B:
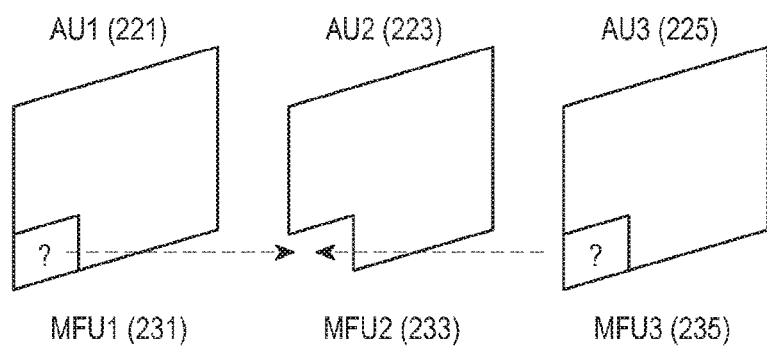

FIGS. 2A and 2B are views illustrating a process of removing an MFU in a network node according to an embodiment of the present disclosure.

For example, FIGS. 2A and 2B illustrate a process of removing an MFU in a network node when MFUs belong to different AUs, according to an embodiment of the present disclosure.

Referring to FIG. 2A, a mutual reference is maintained among the MFUs located in different AUs, in which the mutual reference is shown by a solid line. Referring to FIG. 2B, a mutual reference is not maintained among the MFUs located in the different AUs, in which the mutual reference is shown by a dotted line.

As illustrated in FIG. 2A, the different MFUs 211, 213 and 215 refer to one another among the different AUs 201, 203 and 205. Assuming that the second MFU 213 of the second AU 203 is deleted in the network node, the first MFU 211 in the first AU 201 and the third MFU 215 in the third AU 205 to which the deleted second MUF 213 refers may be deleted.

In contrast, as illustrated in FIG. 2B, because the second MFU 233 in the first AU 223 does not refer to the first MFU 231 in the first AU 221 and the third MFU 235 in the third AU 225, although the second MFU 235 is deleted, the first MFU 231 and the third MFU 235 may be not deleted.

In a state in which the mutual reference among the MFUs in the different AUs is maintained as illustrated in FIG. 2A, if "dependency_counter", "priority" and "multilayer information" in the MFU are shown in consideration of information on the relationship among the MFUs in the one AU, the network node selects the MFU to be deleted without consideration of a corresponding MFU referring to an MFU in a different AU. Accordingly, because the priority and the like of the MFUs included in the one AU are considered when the network node deletes the MFU, effectively delete the MFU is difficult.

For example, if five MFUs are present in the one AU and the network node determines an MFU to be deleted considering the relationship among the five MFUs, an MFU having the lowest priority will be deleted from the five MFUs. However, if the deleted MFU refers to the MFUs included in the different AU, the priority of the corresponding MFU may be changed. Therefore, in order to indicate the priority of the MFUs, a relationship of the corresponding MFU with the different AUs as well as the AU to which the corresponding MFU belongs should be considered. With different pieces of information, if the corresponding information is indicated considering the different AUs, effectively deleting the MFU is possible by using these pieces of information when the MFU is deleted in the network node.

Various embodiments of the present disclosure propose an AU structure indicated in Table 2 and an MFU structure indicated in Table 3 in consideration of the above description.

TABLE 2

Aligned(8) class AccessUnitStructureBox extends Box('ausb')
{unsigned int(32) default_au_duration;
unsigned int(32) number_of_au;

TABLE 2-continued

```
{unsigned int(32) au_duration;                                    //optional
if (version == 0) {unsigned int(32) au_composition_time_offset;}
else {signed int(32) au_composition_time_offset;}
unsigned int(32) decoding_order;                                  //optional
unsigned int(8) rap_flage;                                        //optional}
[ number_of_au ] }
```

The AU structure of Table 2 is included in the MPU according to various embodiments of the present disclosure.

Figure 3:
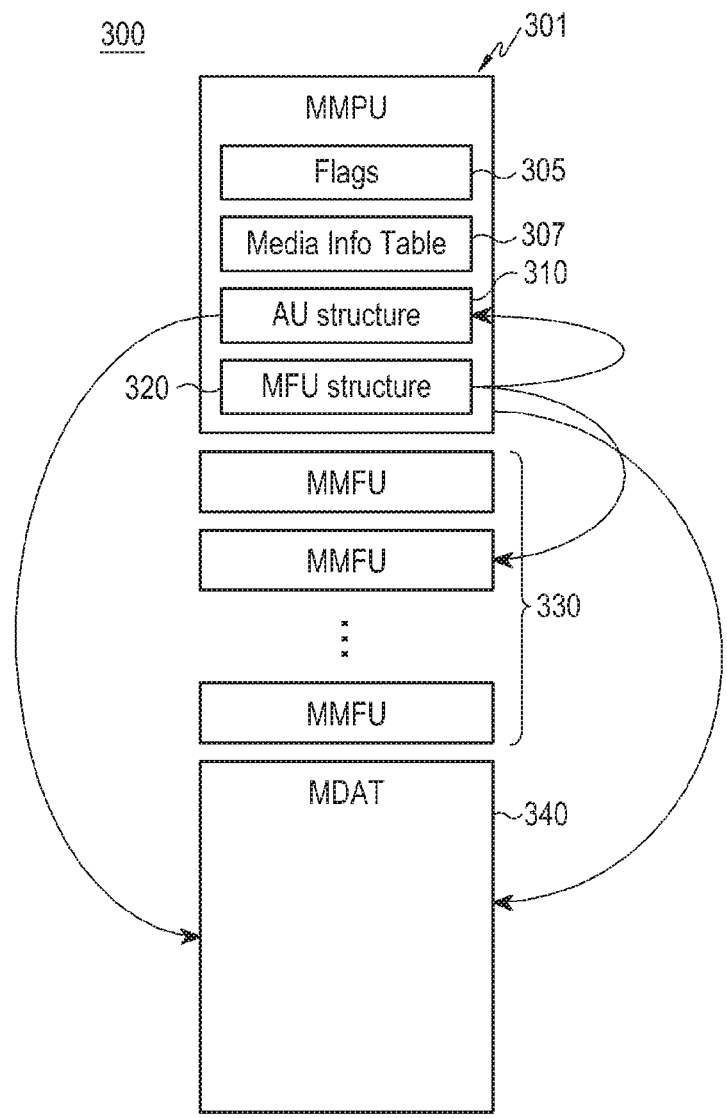
FIG. 3 is a block diagram illustrating an MPU structure according to an embodiment of the present disclosure.

FIG. 3 is a block diagram illustrating an MPU structure according to an embodiment of the present disclosure.

Referring to FIG. 3, the AU structure included in the MPU is denoted by a reference numeral 310.

TABLE 3

```
aligned(8) class MediaFragmentUnitStructureBox extends Box('mfus')
{unsigned int(32) default_media_type_id;
unsigned int(32) item_count;
{if(has_timed_media){    unsigned int(32) number_of_mfu_in_au;}
unsigned int(32) media_type_id;         //optional
unsigned int(32) size;
unsigned int(8) dependency_counter;
unsigned int(8) priority;
unsigned int(32) multilayerInfor;}
[ item_count ]}
```

The MFU structure of Table 3 is included in the MPU according to various embodiments of the present disclosure. The MFU structure included in the MPU is denoted by a reference numeral 320 in FIG. 3. In particular, as provided in Table 3, a range of the MFU to which "dependency_counter", "priority" and "multilayer information" refer extends to the MFUs belonging to the different AUs as well as the current AU to which the corresponding MFU belongs. Further, the MFU structure of Table 3 includes a sequence number (number_of_mfu_in_au) in the AU of the MFU, and information on an actual size of media data located in an MDAT. Further, although not indicated in Table 3, the media data may include an offset in order to inform the network node of its location in the MDAT if necessary. According to various embodiments of the present disclosure, the media data are actually disposed in the MDAT differently from the MPU structure according to the related art.

Hereinafter, a scheme of maintaining a compatibility with a media format reproduction apparatus according to the related which does not support the MMT will be described.

With respect to the conventional MPU structure, the MMFU includes the timed media data therein. However, because the media format reproduction apparatus according to the related art which does not support the MMT cannot recognize the MMFU as described above, there is no box to which the timed media data is accessible in the MPU. In contrast, in relation to the media format according to the related art using addressing based on a chunk and a sample, there is a problem in that timed media data are disposed in a discontinued space. Accordingly, the media format reproduction apparatus according to the related art is not compatible with the MMT.

According to various embodiments of the present disclosure, the sequence number of the MFU and the size of the media data box, and the offset, if necessary, are additionally described, and fragments of the actual media data are sequentially disposed in the MDAT. As a result, a network device or a storage device reads the MPU and then deletes the media data, which are included in the MPU, by a unit of a MFU, thereby effectively delivering or storing the MPU. For example, if a network node, which receives an MPU initially generated by a service provider, is assumed to delete a specific fragment of media data and delivers the MPU in a bad network condition. According to various embodiments of the present disclosure, the network node deletes a certain MMFU box among plural MMFU boxes included in the MPU, and deletes corresponding media data in the MDAT by using the offset and the size information which the corresponding MMFU indicates, so as to reduce the size of the MPU.

Even though some media data are deleted in the network node as described above, the reception side does not receive an MPU again in which the deleted media data are reflected. Rather, the reception side may be required to recognize that a specific media data is deleted from the corresponding MPU. Hereinafter, a scheme in which the reception side recognizes that the media data are deleted will be described.

In a result that a specific network node including a media reproduction apparatus of the reception side receives and reads the MPU, if the specific network node searches MMFUs in the MPU and finds that some MMFU are missing, the media format reproduction apparatus can recognize that the received MPU is not an original MPU which a delivery side delivers, but a modified MPU. However, because the media format reproduction apparatus determines that the received MPU is not an original MPU after the media reproduction apparatus reads all MMFUs, time is necessary for the determination. According to various embodiment of the present disclosure, in order to rapidly identify whether the MPU which network entities receive is the original MPU, the "flag 3" field is included in the MPU.

If "flag 3" is "1 (true)", then the flag 3 indicates that the corresponding MPU is the completely original MPU and includes all the initially generated MFUs. If "flag 3" is "0 (false)", then the flag 3 indicates that the corresponding MPU is a "modified MPU" in which some MFUs are deleted or modified. Various embodiments of the present disclosure are not limited thereto. For example, the inverse thereof is possible. For example, because the flag 3 indicates that the corresponding MPU is the modified MPU, the corresponding MPU may be substituted with the original MPU later in order to reproduce and store the corresponding MPU.

"Flag 3" may be disposed at a position of the offset which is fixed in front of the MPU. Further, after the network entities delete the MFU, a value of the "flag 3" is changed from "1 (true)" to "0 (false)" in order to indicate that the corresponding MPU is modified.

The MMFU structure according to various embodiments of the present disclosure described above is indicated as an example in Table 4.

TABLE 4

```
aligned(8) class MediaFragmentUnitBox
extends FullBox('mmfu', version, 0)
{if (version == 1) {unsigned int(32) mfu_sequence_number;}
else {unsigned int(16) mfu_sequence_number;      }
```

TABLE 4-continued

```
unsigned int(32) size;
unsigned int(32) offset;}
```

It is understood that the MMFU of Table 4 is included in the MPU according to various embodiments of the present disclosure, and includes the sequence number, the size and the offset of the MFU. For reference, the MMFU included in the MPU is denoted by a reference numeral 330 in FIG. 3 as described later.

The MMPU 301 includes a flag 305, media information table 307, an AU structure 310, and an MFU structure 320, and has information related to the MPU by using them. Further, the MPU 300 includes at least one MMFUs 330, and each MMFU includes information on each media data fragment. The MDAT 340 includes one or more pieces of media data (e.g., one or more media data fragments), and the respective media data fragments are sequentially arranged in an order of the sequence number, having the offset and the size included in the MMFUs.

According to various embodiments of the present disclosure, the flag 305 may include "flag 1", "flag2" and "flag 3," as described above. The content of the flags may be identical to the description as mentioned above.

The media information table 307 is a table in which sorts of media types which the MFU has are previously set, and the media type included in the current MFU may be indicated through the table.

The AU structure 310 may be identical to that as previously indicated in Table 2. The AU structure has a structure in that information on an AU and an MFU is excluded from the AU structure shown in FIG. 1.

The AU structure 320 may be identical to that as previously indicated in Table 3. As described above, according to various embodiments of the present disclosure, a range of the MFU to which "dependency counter", "priority" and "multilayer information" of the MFU structure 320 refer extends to the MFUs belonging to the different AUs as well as the current AU including the corresponding MFU.

In contrast, if the MPU 300 has the AU structure 310, the AU structure 310 includes information on the media data included in the corresponding AU. Further, if the MPU 300 has the MFU structure 320, the MFU structure 320 provides information on a relationship between the AU and the MFU.

Furthermore, in the case in which a specific MMFU is deleted, an entity such as the media reproduction apparatus which receives the MPU can recognize a deleted MMFU and an offset and size of the media data which are deleted from the MDAT 340, by using the MFU structure 320. For example, because the MFU structure 320 includes an identifier and size of each MMFU, and offset information on a position in the MDAT 340 of the MMFU 330, recognizing the deleted MMFU and the offset and size of the media data which are deleted from the MDAT by using the information is possible.

Figure 4A:
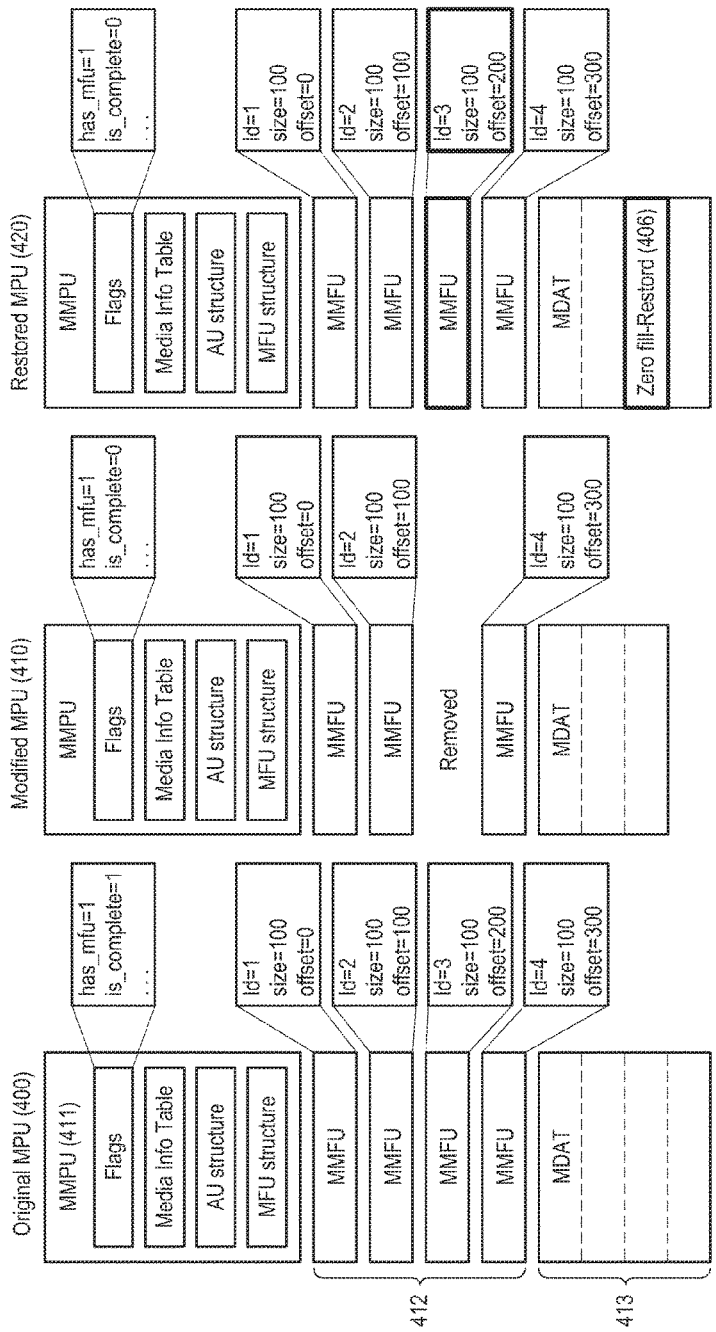
FIGS. 4A and 4B are views illustrating a process of modifying or restoring an MPU after a network node or a receiving terminal receives the MPU, according to an embodiment of the present disclosure.
Figure 4B:
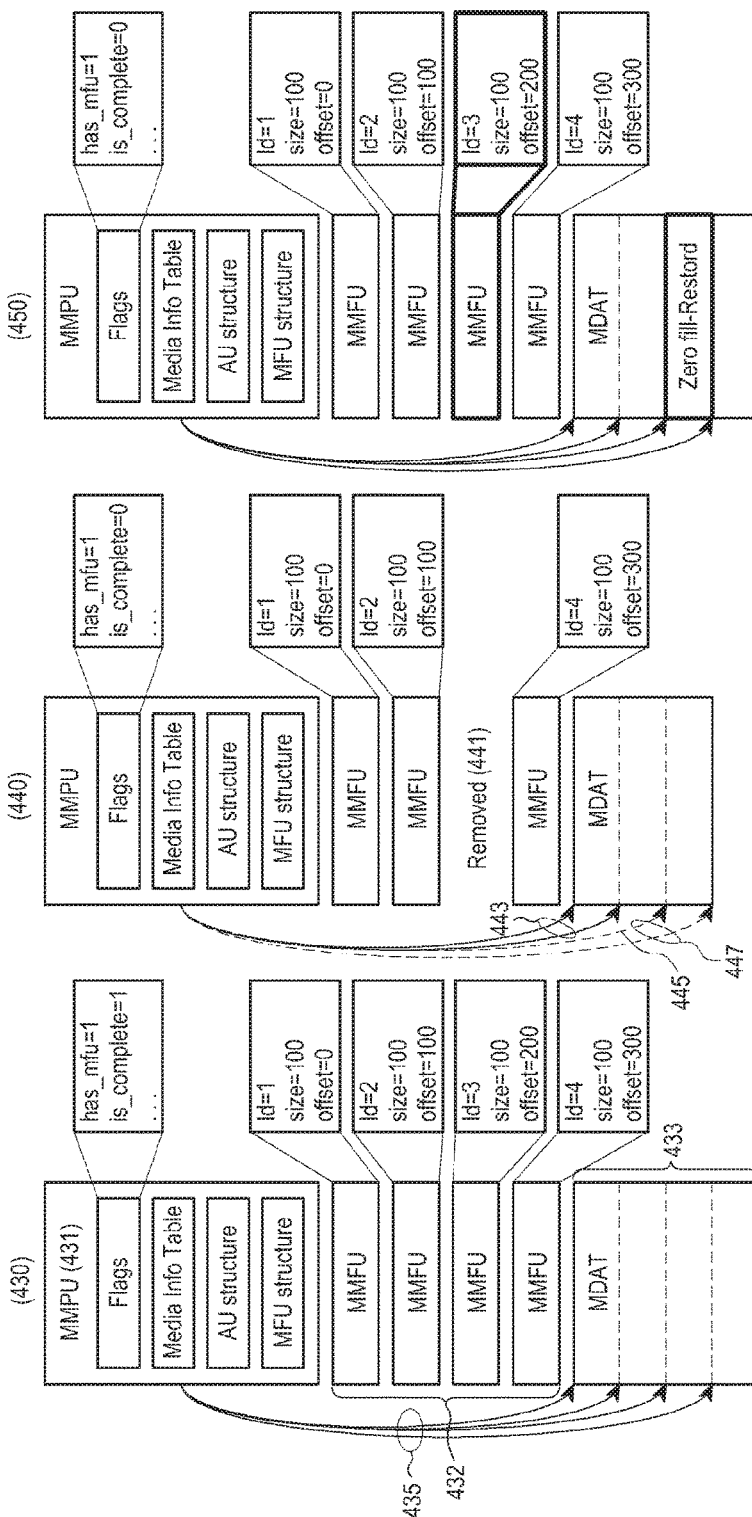

FIGS. 4A and 4B are views illustrating a process of modifying or recovering an MPU after a network node or a receiving terminal receives the MPU, according to an embodiment of the present disclosure.

Referring to FIG. 4A, three MPUs are based on the MPU structure according to various embodiments of the present disclosure as previously illustrated in FIG. 3. Therefore, because the detailed structures of the MPUs are previously described, the description of the detailed structures will be omitted.

An original MPU 400 indicates an initial MPU which is generated by a content provider. It is assumed that the original MPU 400 includes an MMPU 411, four MMFU 412, and four pieces of media data 413 which correspond to the four MMFU respectively. Because the original MPU 400 includes all MMFUs required to be initially delivered and the media data corresponding to the MMFUs respectively, the original MPU 400 is referred to as "original MPU" and a value of "is_complete" becomes "1". The "is_complete" is a flag that may be identical to the previously described "flag 3", and is named to intuitively express a purpose or function.

A modified MPU 410 means that a network entity such as a network node capable of modifying an MPU deletes or modifies some MFUs from the original MPU 400 in order to deliver the MPU or to effectively store the MPU. Because some MMFUs and a corresponding media are deleted or modified from the MPU, the deleted or modified MPU 410 is referred to as "modified MPU" and the value of "is_complete" is set to "0". The "is_complete" is a flag identical to the "flag 3" which was previously described. At this time, an entity which modifies the original MPU 400 and deletes the MMFU and the media data according to necessity can modify the value of "is_complete" from "1" to "0". For example, the value of "is_complete" is "1" when the network entity receives the original MPU 400. However, because the corresponding entity modifies the MPU, the value of "is_complete" is set to "0" in order to indicate the modified MPU.

The restored MPU 420 means that the media format reproduction apparatus or a terminal which stores a received MPU restores the received MPU so as to generate "restored MPU". The terminal which receives the MPU with the value of "is_complete" being "0" is capable of determining the size and offset of the deleted media data by using a size and offset of the media data included in the MMFUs.

Then, a position at which the corresponding media data is deleted from the MDAT is filled with "dummy" data having a size identical to that of the deleted media data. The dummy data is data without a certain meaning, and has a property in that a decoding error does not occur even though a decoder decodes the dummy data.

If the deleted MPU is restored by using the dummy data as described above, the restored MPU 420 is generated. The MPU 420 is not completely identical to the original MPU, but is referred to as "restored MPU" because the data is located at a position at which the information including the conventional media format which does not supports the MPU and MMT indicates. The information having the conventional media format may include an MOOV box, an MOOF box and the like of ISO 14496-12 as an example.

Referring to FIG. 4B, a view illustrating a position of data in an MPU such as, for example, the MPU illustrated in FIG. 4A according to the embodiment of the present disclosure is provided.

The original MPU 430 includes an MMPU 431, four MMFUs 432, and four pieces of media data 433 which correspond to the four MMFUs respectively. Solid arrows 435 in the original MPU 430 indicate positions of initial media data.

In the modified MPU 440, an MMFU 441 with id=3 is deleted. Therefore, the media data corresponding to the MMFU 441 with id=3 is deleted from the MDAT. Media data corresponding to MMFUs having id=1 and id=2 are present at positions identical to those of the media data in the original MPU 430. Two solid arrows 443 indicate that there are no errors in media data which are present at corresponding positions. Because media data indicated by a third dotted arrow 445 from an upper side are media data corresponding to an actual MMFU with id=4, the media have positions which are different from those of media data in the original MPU. Two dotted arrows 447 indicate that there is an error because media data are present at positions which are different from those of media data in the original MPU 430.

According to various embodiments of the present disclosure, when the media reproduction device or the terminal generates the restored MPU 450 by using the dummy data as described above, the generated data are present at positions which are identical to the positions of the data in the original MPU. As a result, because the restored MPU is secured to be compatible with the original MPU, securing compatibility of the restored MPU with the conventional media format is possible.

Hereinafter, types of media used in various embodiments of the present disclosure will be described.

According to various embodiments of the present disclosure, the media types used provide an MIME type suitable for both timed media data and non-timed media data, media initialization information, and basic information.

The timed media data and the non-time media data are provided with one or more media type tables, and provide suitable information which is required to initialize the corresponding media data according to each MIME type.

The representative initialization information of the timed media data includes a parameter set such as a sequence parameter set and a picture parameter set.

A reproduction apparatus which reproduces the MPU starts to reproduce a specific one of MPUs which are continuous in an MMT asset, initializes a decoder by reading a parameter set in the case of the timed media data according to the media type, and applies the timed media data to the decoder so as to complete the reproduction of the MPU. For reference, the MMT asset refers to a set of one or more MPUs.

A file may be a representative example of the non-timed media data. Information for an initialization of the file may include information such as a name, a size, a cyclic redundancy check, and the like of the file. Because the file is provided to be mapped on one MFU and information of a position of a certain file is described in the MFU structure, the reproduction device is capable of extracting a desired file by mapping information and a position of the file when plural files are present in the MPU.

An example of the above mentioned media type table is indicated in Table 5, and an MMPU in the media type table is indicated in Table 6.

TABLE 5

```
aligned(8) class MediaTypeInformationBox extends Box('mtib')
{unsigned int(32) number_of_media;
{unsigned int(32) mime_type;
unsigned int(32) length;
bit(8*length) initializationData;}
[ number_of_media ]}
```

The media type table in Table 5 is included in the MMPU and denoted by a reference numeral 307 as shown in FIG. 3. The corresponding media type table provides information on the type of the media in the MPU. For example, the media type table provides information on which codec and compression method the corresponding media uses.

TABLE 6

```
aligned(8) class AsseltIdentifierBox extends Box('asid')
{unsigned int(32) asset_id_scheme;
```

TABLE 6-continued

```
unsigned int(32) asset_id_length;
unsigned int(8) asset_id_value[asset_id_length];
aligned(8) class MMTProcessingUnitBox
extends FullBox('mmpu', version, 0)
{unsigned int(1) has_mfu;
unsigned int(1) is_complete;
unsigned int(1) has_timed_media;
unsigned int(5) reserved;
AssetIdentifierBox( );
unsigned int(32) mpu_sequence_number;
MediaTypeInformationBox( );
if(has_timed_media){AccessUnitStructureBox( );}
if(has_mfu){MediaFragmentUnitStructureBox( );}}
```

In Table 6, asset information, said information, and an MPU box according to the embodiment of the present disclosure are described.

In Table 6, as described above, "has timed media" is a flag identical to the "flag 1", and indicates that the MPUs are the timed or non-timed media data. Further, "has MFU" corresponds to "flag 2" and indicates whether the MPU has the MFU structure. The "is complete" corresponds to the "flag 3" and indicates whether the MPU is an "original flag" or a "modified flag" having the deleted MFU.

Figure 5:
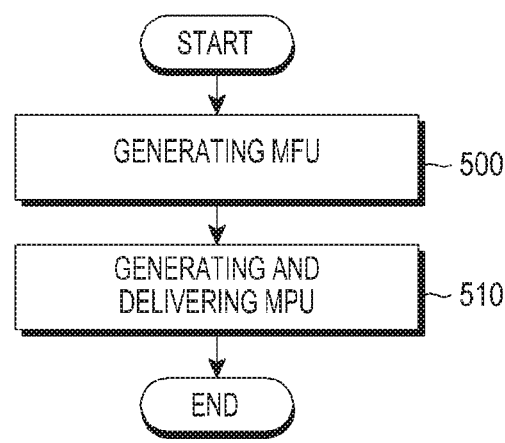
FIG. 5 is a flowchart illustrating a method of delivering multimedia data according to an embodiment of the present disclosure.

FIG. 5 is a flowchart illustrating a method of delivering multimedia data according to an embodiment of the present disclosure.

Referring to FIG. 5, at operation 500, a media data delivering apparatus generates an MFU for media data.

Thereafter, at operation 510, a media data delivering apparatus generates an MPU including information used for reproducing the media data. Then, the media data delivering apparatus delivers the generated MPU.

According to various embodiments of the present disclosure, the MPU has the MPU structure such as the structure illustrated in FIG. 3.

However, it will be understood by a person skilled in the art that an apparatus and method for receiving the media data can be implemented corresponding to the apparatus and method for delivering the media data. Accordingly, the description of the apparatus and method for receiving the media data will be omitted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for transmitting media data in a broadcast network, the apparatus comprising:
   a transceiver; and
   a controller coupled to the transceiver, wherein the controller is configured to:
      identify a media processing unit including media data part and information part, the media data part including at least one fragment of the media data and the information part including information on the media processing unit and information on the at least one fragment of the media data;
      transmit the media processing unit,
   wherein the information part includes first information indicating whether the at least one fragment of the media data in the media processing unit is timed data or non-timed data.

2. The apparatus as claimed in claim 1, wherein the information part includes second information indicating whether the media processing unit is fragmented into at least two fragments.

3. The apparatus as claimed in claim 1, wherein the information part includes third information indicating whether the media processing unit comprises all fragments corresponding to a fragment structure.

4. The apparatus as claimed in claim 1, wherein the information part includes at least one of offset information and length information, a sequence number indicating a sequencing order of the at least one fragment of the media data within the media processing unit, the offset information indicating a position of the at least one fragment of the media data within the media processing unit, or the length information indicating length of the at least one fragment of the media data.

5. The apparatus as claimed in claim 4, wherein the at least one fragment of the media data is placed according to at least one of the sequence number, the offset information, or the length information.

\* \* \* \* \*